(12) United States Patent
Malvern

(10) Patent No.: US 7,267,006 B2
(45) Date of Patent: Sep. 11, 2007

(54) ACCELEROMETER

(75) Inventor: Alan Richard Malvern, Plymouth (GB)

(73) Assignee: BAE Systems PLC, London (GB)

( * ) Notice: Subject to any disclaimer, the term of this patent is extended or adjusted under 35 U.S.C. 154(b) by 128 days.

(21) Appl. No.: 10/529,302

(22) PCT Filed: Feb. 22, 2005

(86) PCT No.: PCT/GB2005/000652

§ 371 (c)(1),
(2), (4) Date: Mar. 25, 2005

(87) PCT Pub. No.: WO2005/083451

PCT Pub. Date: Sep. 9, 2005

(65) Prior Publication Data
US 2006/0112765 A1 Jun. 1, 2006

(30) Foreign Application Priority Data

Feb. 27, 2004 (EP) .................................. 04251138
Feb. 27, 2004 (GB) .................................. 0404368.3

(51) Int. Cl.
*G01P 15/125* (2006.01)
(52) U.S. Cl. .................................. 73/514.32; 73/514.38
(58) Field of Classification Search ............. 73/514.32, 73/514.36, 514.18
See application file for complete search history.

(56) References Cited

U.S. PATENT DOCUMENTS

| 5,392,650 | A | 2/1995 | O'Brien et al. |
| 5,447,067 | A | 9/1995 | Biebl et al. |
| 5,559,290 | A | 9/1996 | Suzuki et al. |
| 5,756,901 | A * | 5/1998 | Kurle et al. ................... 73/777 |
| 6,276,207 | B1 * | 8/2001 | Sakai et al. .............. 73/514.16 |
| 6,389,899 | B1 | 5/2002 | Partridge et al. |
| 6,508,125 | B2 * | 1/2003 | Otani ....................... 73/514.32 |
| 6,705,164 | B2 * | 3/2004 | Willig et al. .............. 73/504.12 |
| 2001/0032508 | A1 | 10/2001 | Lemkin et al. |
| 2001/0047688 | A1 | 12/2001 | Woodruff et al. |
| 2002/0144548 | A1 | 10/2002 | Cohn et al. |
| 2004/0025589 | A1 | 2/2004 | Kurle et al. |

FOREIGN PATENT DOCUMENTS

| EP | 0 338 688 A1 | 3/1989 |
| EP | 0 523 862 A1 | 6/1992 |
| WO | WO 98/52051 | 11/1998 |
| WO | WO 01/51931 A3 | 7/2001 |

\* cited by examiner

*Primary Examiner*—Helen Kwok
(74) *Attorney, Agent, or Firm*—Crowell & Moring LLP

(57) ABSTRACT

The accelerometer has a base (2), an outer planar ring-like support frame (17) fixedly bonded to the base (2), and an inner planar ring-like support frame (18) flexibly suspended within the outer frame (17) by mounts (19) connecting the inner frame (18) to the outer frame (17) so that the inner frame (18) is spaced from the base (2), co-planar with the outer support fram (17) so as to provide flexible suspension for the inner support frame (18) reducing compressive and/or tensile forces on mounting legs (4) flexibly mounting a proof mass (3) in the inner support frame (18).

18 Claims, 9 Drawing Sheets

Prior Art

Fig.11.
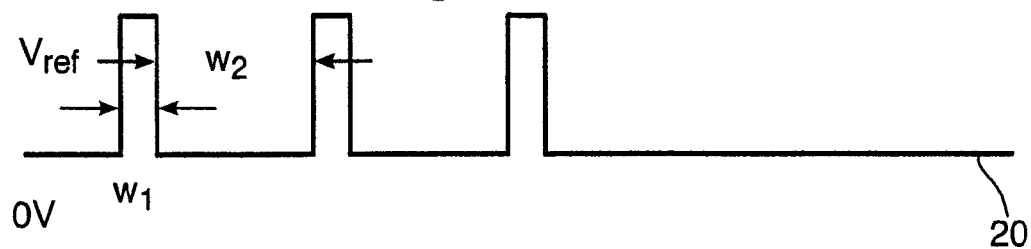
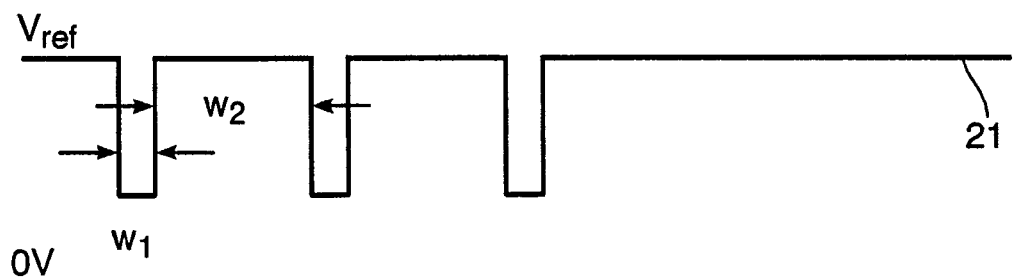
Fig.12.
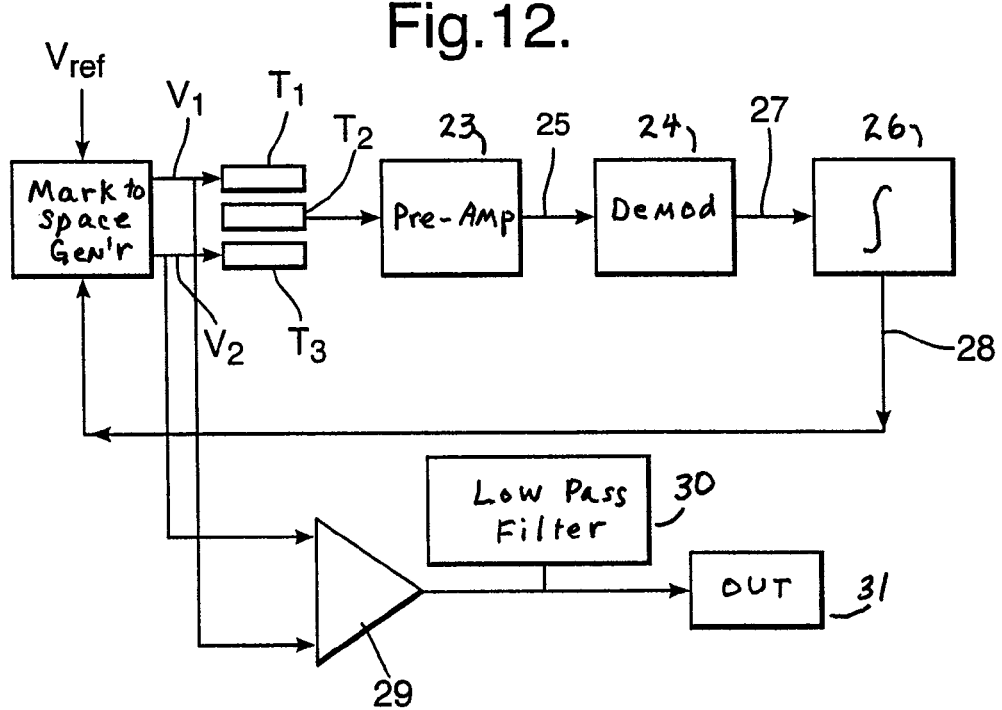

Fig.15. +ve offset   −ve offset
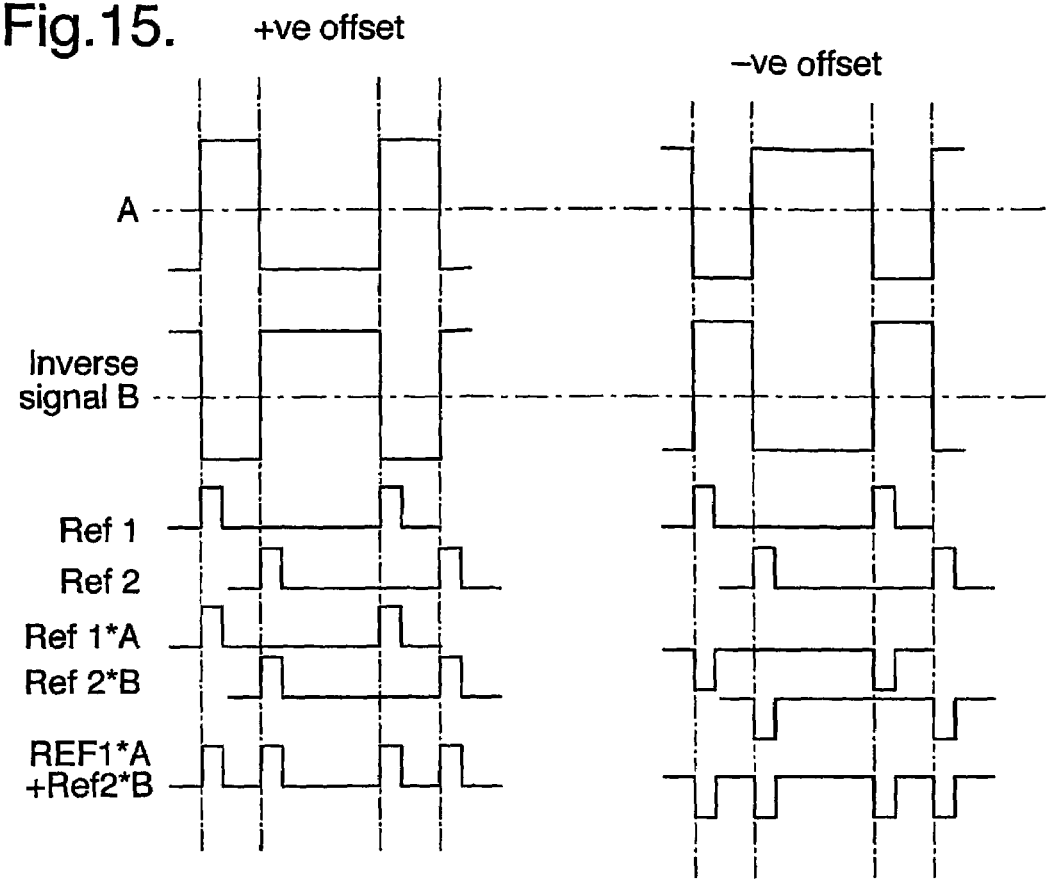
Fig.16. +ve offset   −ve offset
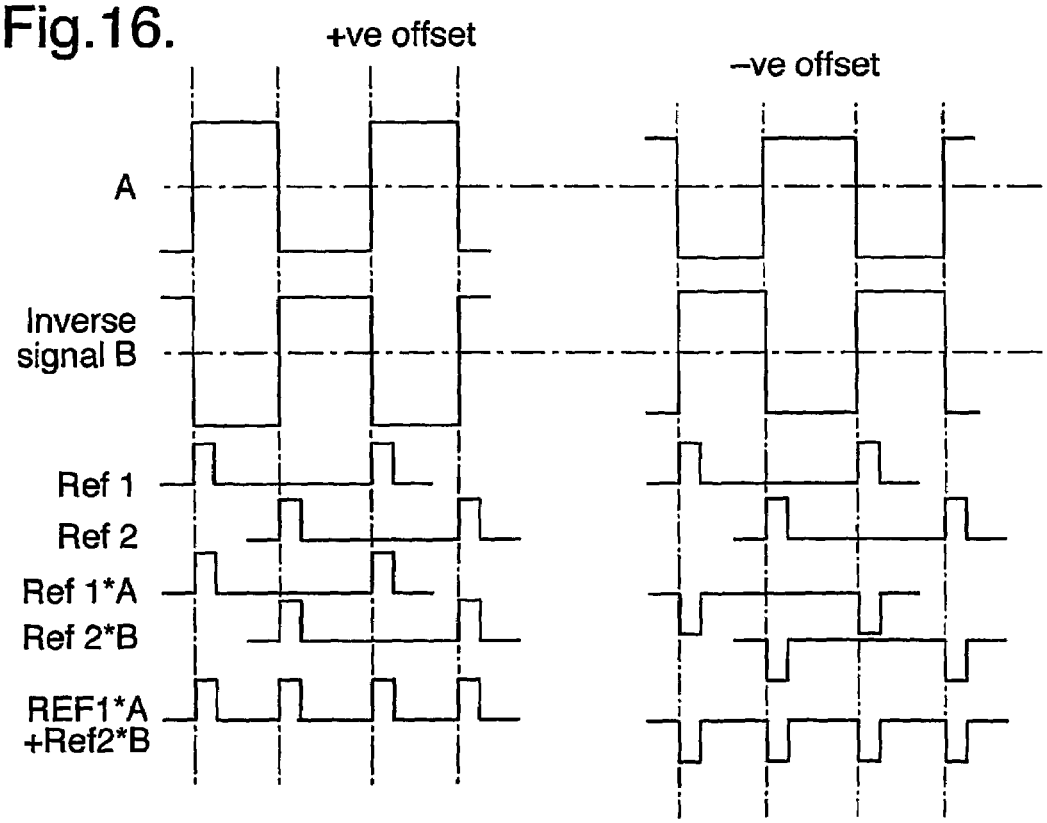

ACCELEROMETER

This invention relates to a capacitive accelerometer made at least in part from silicon.

BACKGROUND OF THE INVENTION

It has been proposed to manufacture an accelerometer in one process step within the plane of a silicon wafer by a deep trench etching process. Such a proposed accelerometer is shown in plan view in FIG. 1 of the accompanying drawings. This proposed accelerometer employs a substantially planar, ring-like support frame 1 made from silicon which is anodically bonded to a plate-like base 2 as shown in FIG. 2 of the accompanying drawings. FIG. 2 is a cross-sectional view taken on the line A-A in FIG. 1.

The accelerometer of FIGS. 1 and 2 has a substantially planar plate-like proof mass 3 made from silicon which is moveably mounted in the support frame 1 and co-planar therewith whilst being separated from the underlying glass base 2. The proof mass 3 is carried on four or more flexible mounting legs 4 made from silicon each co-planar with the proof mass 3 and the support frame 1. Each mounting leg 4 is connected at one end 4a to the proof mass and connected at another end 4b to the support frame 1 so that the proof mass 3 is mounted for linear movement in a sensing direction B in the plane containing the support frame 1, proof mass 3 and mounting legs 4, in response to acceleration change applied to the accelerometer. The mounting legs 4 extend substantially perpendicularly to the sensing direction B.

A plurality of interdigitated capacitor fingers 9 shown simplistically in FIG. 1 are mounted in a gaseous medium in the support frame 1 for sensing linear movement of and for providing gaseous medium squeeze damping for, the proof mass 3 in the sensing direction B, with the fingers 9, proof mass 3, mounting legs 4 and support frame 1 being co-planar and formed from a single plate of mono-crystalline silicon. The fingers 9 comprise fixed first, second, third and fourth arrays 5, 6, 7 and 8 respectively of laterally spaced fingers 9 extending substantially perpendicularly to the sensing direction B and away from the support frame 1 towards the proof mass 3. The first and second arrays 5, 6 are located on one side of the proof mass 3 and the third and fourth arrays 7, 8 are located on the opposite side of the proof mass 3 as shown in FIG. 1. The fingers of the first, second, third and fourth arrays 5, 6, 7 and 8 are fixedly bonded to the base 2. Also provided are moveable fifth, sixth, seventh and eighth arrays, 10, 11, 12 and 13 of laterally spaced fingers 9 extending substantially perpendicularly to the sensing direction B from and attached to the proof mass 3 towards to the support frame 1 with the fifth and sixth arrays 10, 11 being located on said one side of the proof mass 3 and interdigitated respectively with the first and second arrays 5, 6 and with the seventh and eighth arrays 12, 13 being located on said opposite side of the proof mass 3 and interdigitated respectively with the third and fourth arrays 7, 8. The interdigitation of the first and fifth arrays 5, 10 and of the third and seventh arrays 7, 12 is at a first offset 14 in one direction in the sensing direction B from a median line between adjacent fingers in the first, second, third and fourth array 5, 6, 7 and 8 and the interdigitation of the second and sixth arrays 6, 11 and of the fourth and eighth arrays 8, 13 is at a second offset 15 in the opposite direction to the first offset 14.

The fingers 9 have a narrow gap with atmospheric pressure gas between them, typically air. Under deflection of the proof mass 3 the gas can move and the viscosity of the air sets the rate at which the gas moves and thus the damping force. Additionally the interdigitated fingers 9 of the eight arrays form two sets of sensing capacitors between the fixed support frame 1 and the proof mass 3. Typically the first array 5 and third array 7 of fingers form a first or upper terminal and the second array 6 and fourth array 8 form a second or base terminal for the capacitors. The fixed fingers 9 of the arrays 5, 7, 6 and 8 are electrically isolated from the proof mass 3 and anodically bonded to the base 2 so that the interdigitated fingers form the sensing and forcing capacitors. The sensing capacitors fingers are offset so that when a voltage is applied between the first terminal, and the proof mass 3 or between the second terminal and the proof mass 3, there is a net attractive force depending on the sign of the voltage difference. Without an offset there would be no net force.

The support frame 1 has a substantially rectangular ring-like shape surrounding an inner open area in which is located the proof mass 3 which has a substantially rectangular shape. The mounting legs 4 extend substantially perpendicularly to the sensing direction in spaced array with at least two extending between an inner wall of the support frame 1 defining the inner open area and a facing outer wall of the proof mass 3 and with at least two extending between an opposing second inner wall of the support frame 1 defining the open inner area and a facing second outer wall of the proof mass. At least four earth screens 16 are provided located within the inner open area and each being associated with and partially surrounding a respective one of the first, second, third and fourth arrays, 5, 6, 7 and 8 of fingers and being operable to shield the arrays of fingers from the support frame 1 and being electrically insulated from the support frame 1. As the fixed capacitor fingers have a high alternating current voltage applied, for synchronous demodulation, it is this signal frequency that appears on the proof mass 3 determining the positional offset. It is thus necessary to screen the high AC voltage drive from the small AC signals on the proof mass. The earth screens are held at zero voltage so as to minimise the cross-coupling from the drive to the sensing signals. The earth screens 16 are anodically bonded through to the base 2 for good electrical isolation.

One of the key problems of this proposed accelerometer is the differential expansion rate between the silicon from which the support frame 1, proof mass 3, mounting legs 4 and fingers 9 are composed and the material of the base 2, preferably glass. This causes flexure of the accelerometer assembly that alters the tensile force along the mounting legs 4. Any longitudinal force on the silicon will apply an additional tensile force to the legs 4 causing the resonance frequency to go up and the scale factor to go down and vice versa. Thus due to the differential expansion between the silicon and the underlying base 2 as the temperature is changed a bimetallic effect is set up which gives rise to a concave or convex bow of the accelerometer assembly. Compressive and tensile forces on the mounting legs 4 are very undesirable as they cause a degradation of accuracy of the accelerometer and a reduction of operational stability over an operating temperature range. Additionally the scale factor of the accelerometer is changed with the changes in tension and compression.

There is thus a need for a generally improved accelerometer which at least minimises the foregoing disadvantages inherent in the proposed accelerometer.

SUMMARY OF THE INVENTION

According to a first aspect of the present invention there is provided an accelerometer having
- a plate-like base made from an electrically non-conductive material,
- an outer substantially planar, ring-like, support frame fixedly bonded to the base,
- an inner substantially planar, ring-like, support frame flexibly suspended within the outer frame by mounts connecting the inner frame to the outer frame so that the inner frame is spaced from the base and co-planar with the outer support frame,
- a substantially planar plate-like proof mass, moveably mounted in the inner support frame which is co-planar therewith,
- four or more flexible mounting legs each co-planar with the proof mass and inner support frame,
- with each mounting leg being connected at one end to the proof mass and connected at another end to the inner support frame so that the proof mass is mounted for linear movement in a sensing direction in the plane containing the outer support frame, inner support frame, proof mass and mounting legs, in response to acceleration change applied to the accelerometer,
- with the mounting legs extending substantially perpendicularly to the sensing direction,
- and with the flexible suspension of the inner support frame reducing compressive and/or tensile forces on the mounting legs as a function of temperature on the accelerometer.

Preferably the outer support frame is anodically bonded to the base.

Conveniently the base material is glass.

Advantageously the accelerometer includes a plate-like cap, made from an electrically non-conductive material, anodically bonded to the outer support frame.

Preferably the cap material is glass.

Conveniently the accelerometer includes a plurality of interdigitated capacitor fingers fixedly mounted, in a gaseous medium, in the inner support frame for sensing linear movement of, and for providing gaseous medium squeeze damping for, the proof mass in the sensing direction, with the fingers, proof mass, mounting legs, inner support frame and outer support frame being co-planar and formed from a single plate of monocrystalline silicon.

Advantageously the gaseous medium is air, nitrogen or neon.

Preferably the fingers comprise fixed first, second, third and fourth arrays of laterally spaced fingers extending substantially perpendicularly to the sensing direction and away from the inner support frame towards the proof mass, with the first and second arrays being located on one side of the proof mass and with the third and fourth arrays being located on the opposite side of the proof mass, and moveable fifth, six, seventh and eighth arrays of laterally spaced fingers extending substantially perpendicularly to the sensing direction from and attached to the proof mass towards the inner support frame, with the fifth and sixth arrays being located on one side of the proof mass and interdigitated respectively with the first and second arrays and with the seventh and eighth arrays being located on said opposite side of the proof mass and interdigitated respectively with the third and fourth arrays, with the interdigitation of the first and fifth arrays and of the third and seventh arrays being at a first offset in one direction in the sensing direction from a median line between adjacent fingers in the first, second, third and fourth arrays, and with the interdigitation of the second and sixth arrays and of the fourth and eighth arrays being at a second offset equal and in the opposite direction to the first offset.

Conveniently the accelerometer includes means for providing a first drive voltage to the first and third offset arrays of fingers and a complementary opposite second drive voltage to the second and fourth offset arrays of fingers such that the interdigitated fingers provide for the proof mass sensing of displacement in response to acceleration applied to the accelerometer, drive and damping displacement, and means for providing pulse width modulation of the first and second drive voltages with a constant frequency to provide an electrostatic restoring force on the proof mass according to $$F = \frac{CV^2}{2d}$$

where F is the restoring force, C is the capacitance, V is the voltage between the first and second offset arrays of fingers and d is the capacitance gap between the fingers.

Advantageously the proof mass, mounting legs, inner and outer support frames and interdigitated fingers are formed by dry etching from a plate of silicon which is orientated in the [111] or [100] crystal plane.

Preferably the outer support frame has a substantially rectangular ring-like shape surrounding a first inner open area in which is mounted the inner support frame via two said mounts spaced apart in the sensing direction and each connecting one side of the outer support frame to one side the inner support frame.

Conveniently the inner support frame has a substantially rectangular ring-like shape surrounding a second inner open area in which is located the proof mass which has a substantially rectangular shape and the mounting legs extend substantially perpendicularly to the sensing direction in spaced array, with at least two legs extending between a first inner wall of the inner support frame defining the second inner open area and a facing first outer wall of the proof mass and with at least two legs extending between an opposing second inner wall of the inner support frame defining the second inner open area and a facing second outer wall of the proof mass.

Advantageously the mounting legs have a high compliance in the sensing direction and low compliance in other directions.

Preferably the outer support frame, first, second, third and fourth arrays of fingers are anodically bonded to the base and the mounting legs, proof mass, inner support frame and fifth, sixth, seventh and eighth arrays of fingers are spaced from the base.

Conveniently the accelerometer includes at least four earth screens located within the second inner open area each being associated with and partially surrounding a respective one of the first, second, third and fourth arrays of fingers, being operable to shield the arrays of fingers from the inner support frame and being electrically insulated from the inner support frame.

Conveniently the earth screens are fixedly mounted by anodic bonding to the base.

Advantageously the means for providing the first and second drive voltages and for providing pulse width modulation thereto include a mark to space generator for receiving a constant fixed reference voltage $V_{REF}$ and for supplying complementary first and second drive voltages which together do not exceed $V_{REF}$ to the first and third offset arrays of fingers and to the second and fourth offset arrays of fingers respectively, a pre-amp for receiving an output voltage from the proof mass corresponding to displacement thereof, a demodulator for receiving and demodulating an output from the pre-amp, an integrator/loop filter for receiving, integrating and filtering an output from the demodulator and for in turn feeding a drive signal to the mark to space generator and a differential amplifier with low pass filtering for monitoring the first and second drive voltage values.

Preferably the demodulator includes monostable circuits for limiting the pulse width of reference signals from the demodulator.

Other objects, advantages and novel features of the present invention will become apparent from the following detailed description of the invention when considered in conjunction with the accompanying drawings.

BRIEF DESCRIPTION OF THE DRAWINGS

FIG. 11 is a diagrammatic view showing the pattern of voltages on the first or upper terminal and second or base terminal of the capacitor of an accelerometer according to FIG. 3 under positive G forces, FIG. 12 is a block diagram of a closed loop electronic control circuit for an accelerometer according to FIG. 3, FIG. 15 is a graphical representation of the signals involved in demodulation for the control circuit of FIGS. 12 and 13, FIG. 16 is a view similar to that of FIG. 15 but showing signals when the mark/space ratio changes.

DETAILED DESCRIPTION OF THE INVENTION

Figure 1:
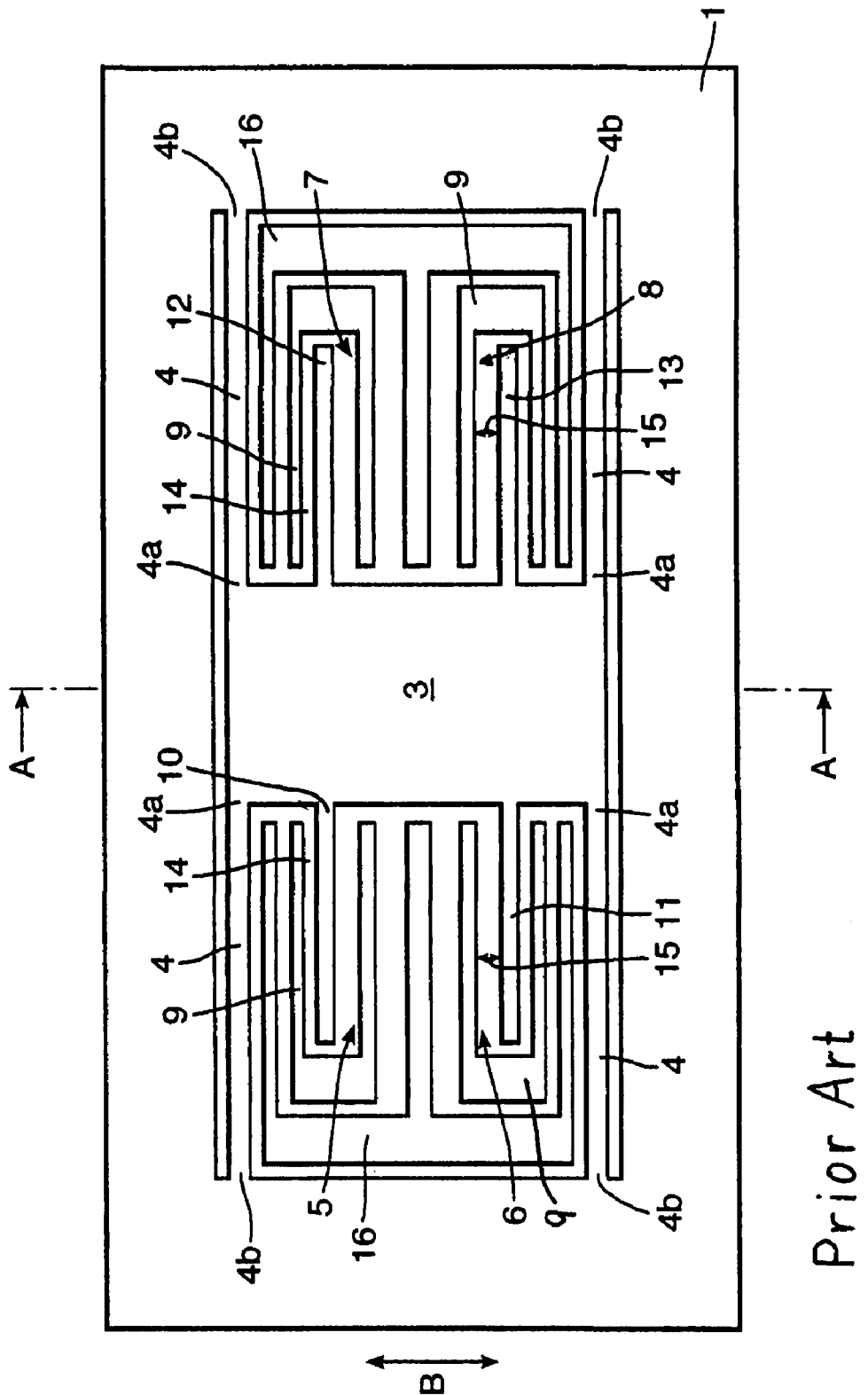
FIG. 1 is a diagrammatic plan view of a known accelerometer not according to the present invention.
Figure 2:
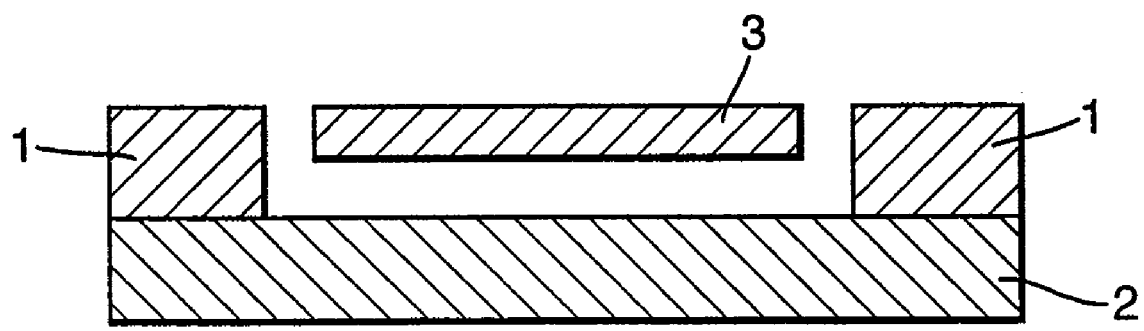
FIG. 2 is a cross-sectional view taken along line A-A of the accelerometer of FIG. 1 not according to the present invention.
Figure 3:
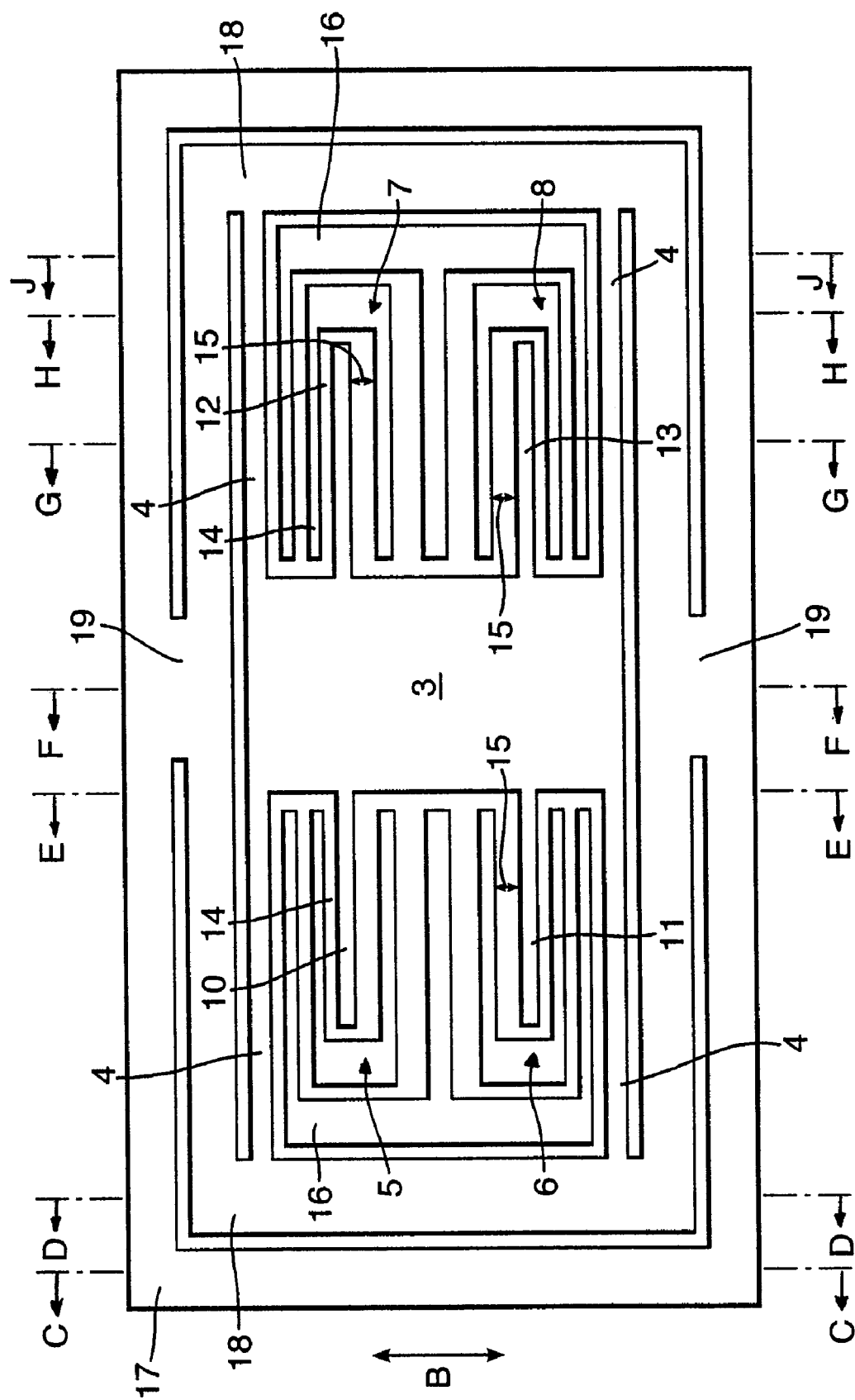
FIG. 3 is a diagrammatic plan view of an accelerometer according to the present invention.
Figure 4:
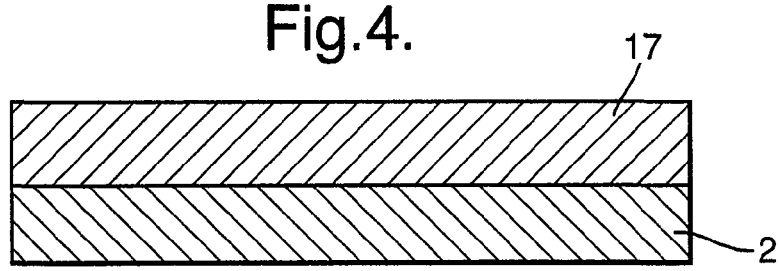
FIG. 4 is a cross-sectional view taken on the line C-C of FIG. 3.
Figure 5:
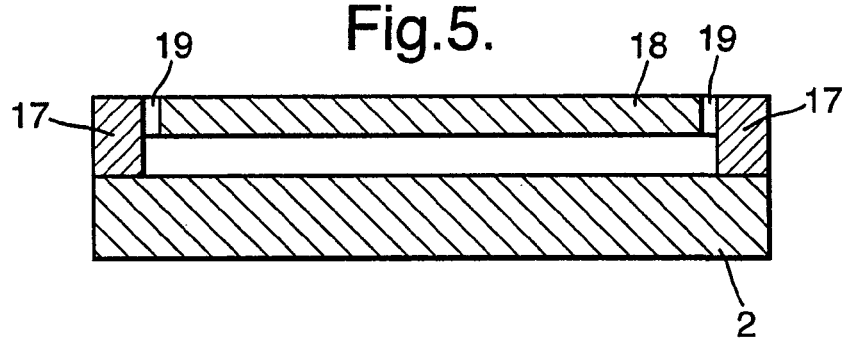
FIG. 5 is a cross-sectional view taken on the line D-D of FIG. 3.
Figure 6:
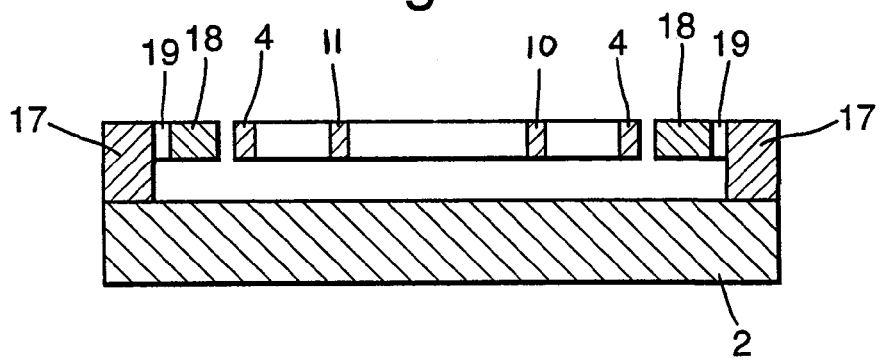
FIG. 6 is a cross-sectional view taken on the line E-E of FIG. 3.
Figure 7:
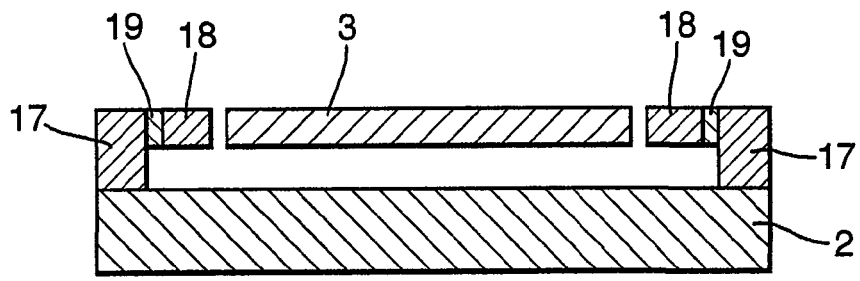
FIG. 7 is a cross-sectional view taken on the line F-F in FIG. 3.
Figure 8:
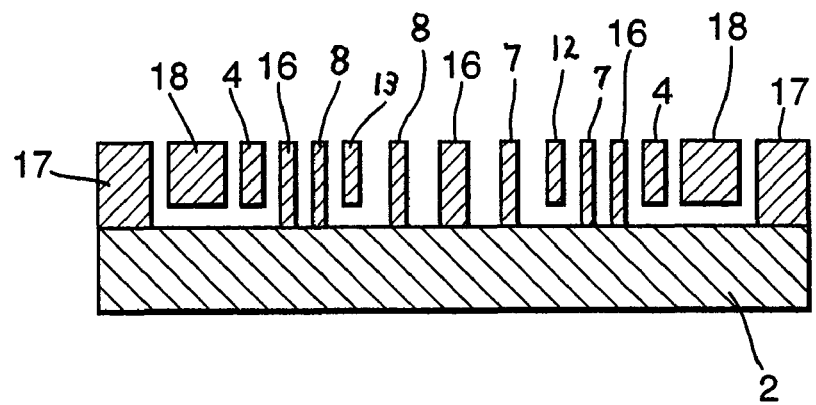
FIG. 8 is a cross-sectional view taken on the line G-G in FIG. 3.
Figure 9:
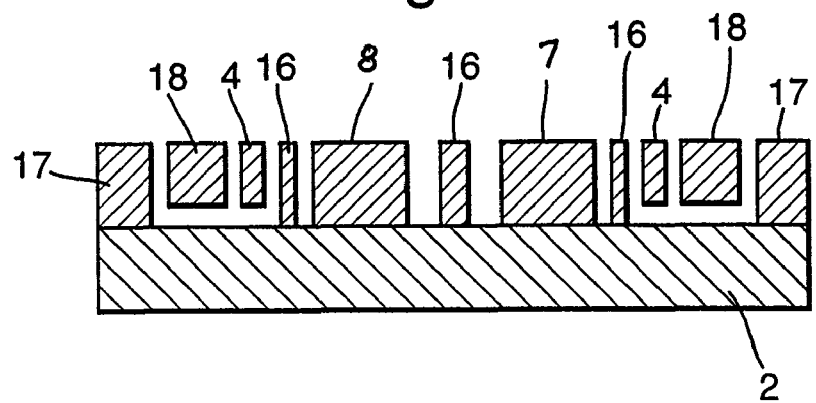
FIG. 9 is a cross-sectional view taken on the line H-H in FIG. 3.
Figure 10:
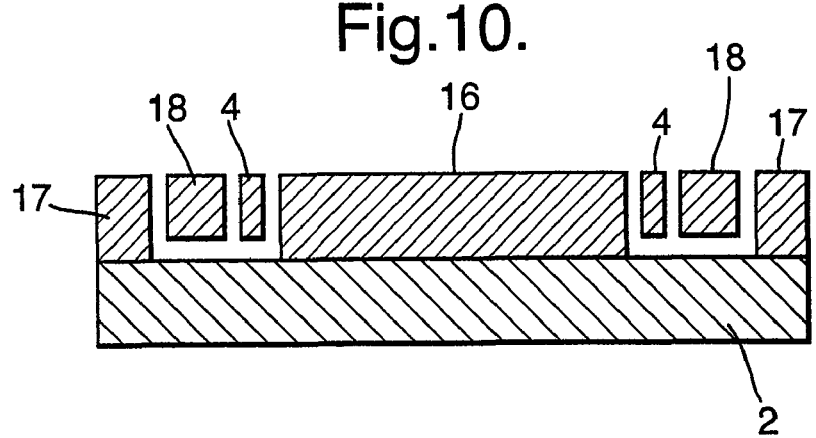
FIG. 10 is a cross-sectional view taken on the line J-J in FIG. 3.

As aforesaid one of the key problems associated with the known accelerometer of FIGS. 1 and 2 of the accompanying drawings is the differential expansion rate between the silicon constituting the support frame 1, proof mass 3, mounting legs 4, fingers 9 and earth screen 16 and the underlying glass base to which the support frame 1, first, second, third and fourth arrays of 5, 6, 7 and 8 of fingers and earth screen 16 are attached. The differential expansion rate will cause flexure of the silicon/glass accelerometer assembly that will alter the tension along the mounting legs 4. The resonance frequency, ω of the proof mass determines the scale factor of the accelerometer. The scale factor, open loop, is defined by the deflection of the proof mass 3 per unit of acceleration. The scale factor is proportional to $1/\omega^2$. The resonance frequency of the proof mass is determined by the natural frequency of the mounting legs 4 and proof mass 3, which for a stiffness k and a given mass m gives;

$$\omega = \sqrt{\frac{k}{m}} \quad (1)$$

Relationship 1 applies for simple harmonic motion and is approximately true in this case. The stiffness k can be altered by longitudinal tension/compression on the mounting legs 4. Thus if there is an additional tensile force on the mounting legs 4 the resonance frequency will go up and the scale factor will go down and vice versa. Any longitudinal force on the silicon of the accelerometer will set tension in the mounting legs 4. Thus due to the differential expansion between the silicon and the glass of the base 2 as the temperature is changed, a bimetallic effective is set up which gives rise to a concave or convex bow of the silicon/glass accelerometer assembly. Compressive forces are very serious for the silicon as they reduce the resonance frequency to a low value. This will cause a very large scale factor which will be temperature dependent. The compressive forces may be so large that the proof mass 3 is pushed to one side and/or upwards causing a large bias and eventual bistating with the proof mass being forced against the support frame 1. Under closed loop controlled conditions the proof mass does not move and only a restoring force proportional to the inertial force due to acceleration is present so that the scale factor is given by this force divided by the acceleration.

In order to overcome or at least minimise the temperature dependence of the scale factor due to variation of tension/compression in the mounting legs 4 an accelerometer according to the present invention as illustrated in FIGS. 3 to 10 and 14 as modified or not by the electronic control features of FIGS. 11, 13 and 15 to 18 of the accompanying drawings has in effect a de-coupled support frame. In the accelerometer of the present invention as illustrated in FIGS. 3 to 10 and 14 and FIGS. 11 to 18 like features already described and illustrated with reference to FIGS. 1 and 2 will be given like reference numerals and will not be further described in detail. In the known accelerometer of FIGS. 1 and 2 the single support frame 1 to which the mounting legs 4 are attached is anodically bonded to the glass base 2 to form a rigid support structure. In the accelerometer of the present invention according to FIGS. 3 to 10 and 14 as modified or not by FIGS. 11, 12, 13, 15, 16, 17 and 18 the single support frame 1 is replaced by a two part structure having an outer substantially planar ring-like, support frame 17 fixedly bonded, preferably anodically bonded, to the base 2 which preferably is made of glass. An inner substantially planar, ring-like, support frame 18 is provided flexibly suspended within the outer frame by mounts 19 connecting the inner frame 18 to the outer frame 17 so that the inner frame 18 is spaced from the base 2 and co-planar with the outer support frame 17. Thus the inner support frame 18 is free to move to a limited extent with the proof mass 3 to which it is attached by the mounting legs 4 to the extent that it is permitted to do so by its attachment through the mounts 19 to the fixed outer support frame 17 which is anodically bonded to the glass base 2. Suitable glasses for the base 2 include Corning type 7070 (Trade Mark) and Hoya SD-2 (Trade Mark). The anodic bonding involves the migration of mobile ion species away from the bonding interface under an applied high voltage between the silicon wafer and the glass. This results in a depletion zone at the interface with a very high electric field. It is this field which causes the electrostatic attraction of the silicon and the glass thereby bonding the two together at elevated temperature of typically of 350° C. to 450° C. by co-valent bonding. Preferably a voltage in the region to 400 to 800 volts is applied for a period in the range of from 30 minutes to 1 hour to effect the bond. The mounts 19 are made from the same silicon as is the outer and inner support frames 17, 18, proof mass 3, mounting legs 4, and first to eighth arrays (5, 6, 7, 8, 10, 11, 12, 13) of fingers. Typically there are fifty eight fingers fixed to the proof mass 3 in each array of moveable fingers. This can be seen more clearly from the detail of FIG. 14.

The mounting legs 4 support the proof mass 3 in the inner support frame 18. The inner support frame 18 is rigid in the vertical plane with a high natural resonance frequency, typically greater than 10 kHz, that is out of the plane of FIG. 3, unlike the proof mass 3 which has a defined resonance frequency in the sensing axis, typically in the range of 1 to 3 kHz which is the vertical axis which is set by the compliance of the mounting legs 4. The width of the inner support frame 18 is large compared to the width of the mounting legs 4 so that the compliance is set by the legs rather than by the stiffness of the inner support frame 18.

The earth screens 16 are anodically bonded to the glass base 2, electrically to separate the high drive voltages that are applied to the fixed first, second, third and fourth arrays of fingers 5, 6, 7 and 8. The earth screens 16 also separates the high drive voltages on the fixed arrays of fingers from the moveable silicon mass comprised of the proof mass 3, mounting legs 4 and moveable arrays of fingers 10, 11, 12 and 13. The moveable silicon mass has a low voltage. It is this low voltage which is a measure of how far the proof mass 3 is from the central position and goes to a null at the central position. The voltages are normally applied as an alternating current signal so that the voltages referred to relate to the mark to space signal applied to the fixed arrays of fingers 5, 6, 7 and 8.

The inner support frame 18 at the ends of the mounting legs 4 is freely suspended so does not contribute compressive/tensile forces onto the mounting legs 4 as a function of temperature. Thus the scale factor change as a function of temperature will be significantly reduced and the bias performance over temperature is correspondingly improved. Additionally there is the further benefit that the mounting of the outer support frame 17 to any encapsulation is less critical. By virtue of the configuration the accelerometer according to the present invention will maintain a high robustness allowing use in a broad range of applications.

In an accelerometer according to the present invention electrostatic forces are used to null out the inertial force due to acceleration on the proof mass 3. The proof mass 3 which moves under the influence of acceleration forms the middle terminal $T_2$ of a three terminal capacitance structure forming differential capacitors C1 and C2. The first and third arrays 5 and 7 of fingers effectively form the upper terminal $T_1$ and the second and fourth arrays of fingers 6 and 8 effectively form the base terminal $T_3$ as illustrated diagrammatically in FIG. 12 of the accompanying drawings.

Under acceleration there is a differential capacitance set up as below:

$$\Delta C = A\varepsilon_0 \left( \frac{1}{d - \delta(a)} - \frac{1}{d + \delta(a)} \right) \quad (2)$$

where A is the area of the capacitor plates and $\varepsilon_0$ is the permittivity of free space and d is the capacitor gap, and $\delta(\alpha)$ is the movement of the proof mass under an acceleration α. If an electrostatic force F is applied to the plates to balance the acceleration then we have:

$$F = m\alpha \quad (3)$$

where m is the effective mass of the proof mass.

For an accelerometer to work there are therefore two steps:
 a) sensing the displacement
 b) applying the force to null the displacement For a three terminal system approaches such as time division multiplexing can be used, when a certain portion of the time is spent in sensing the displacement and the remaining in the forcing. The ultimate noise of the device will depend on the accuracy with which the null can be sensed, so having only a proportion of the time in sensing implies that the noise will be higher. Also it implies that the amount of force that can be applied will be reduced.

For a five terminal device another approach has been proposed carrying out the sensing with one set of electrodes and the forcing with another. This approach uses a push-pull drive stage, with DC voltage biasing of the proof mass which gives a linear response. In this approach an anti-phase square wave is applied to the two sensing terminals $T_1$ and $T_2$ and a signal on $T_2$ is then proportional to the out of null condition. The signal is amplified, demodulated and filtered, and fed back to two further terminals to apply the balance force in a push-pull manner.

This approach cannot be used with a three terminal accelerometer without time division multiplexing which creates problems, particularly when it is desired to provide for the accelerometer a linear response and a digital output.

To this end pulse width modulation of the signals on the two outer terminals $T_1$ and $T_3$ is used with a constant frequency. The electrostatic restoring force is given by:

$$F = qE = \frac{CV^2}{2d} \quad (4)$$

where C is the capacitance, V is the voltage between the plates and d is the capacitance gap. Note the quadratic dependence of the force on the applied voltage.

FIG. 11 of the accompanying drawings shows the voltage on the terminal $T_1$ at 20 and the voltage on $T_3$ at 21 for positive g forces. The voltages are interchanged on terminals $T_1$ and $T_3$ for negative acceleration on the accelerometer.

Under acceleration the mark/space ratio becomes unequal, with a width $w_1$ followed by a width $w_2$. The voltages always go between zero and a constant fixed voltage $V_{ref}$ for both plates. The voltages on the two terminals are exactly complementary, so that when there is a voltage on terminal $T_1$ there is no voltage on terminal $T_3$ and vice versa. Thus the average net force F on the proof mass over the cycle time is given by:

$$F = C_1 V_1 E_1 - C_2 V_2 E_2 \quad (5)$$
$$= V_{ref}[C_1 E_1 w_1 - C_2 E_2 w_2]$$

$$E_1 = \frac{V_{ref}}{2d_1} \quad (6)$$

$$E_1 = \frac{V_{ref}}{2d_2} \quad (7)$$

thus $$F = V_{ref}^2 \left[ \frac{C_1 w_1}{2d_1} - \frac{C_2 w_2}{2d_2} \right] \quad (8)$$

Note that the quadratic forcing term is set by $V_{ref}$ which is a constant. The force is linearly dependent on the time difference of the mark/space ratio so that the goal of linearising the output with input acceleration has been achieved without the need for a separate bias on the proof mass 3.

If $w_1 = w_2$ and the other terms are not equal, there will be a net force but this will be a fixed force and represents a bias. This bias will need to be nulled so that the closed loop implementation the condition of equal mark/space ratio corresponds to zero output force. The nulling can be carried out by the use of a trimming capacitor with respect to either of the two sense capacitors.

Figure 13:
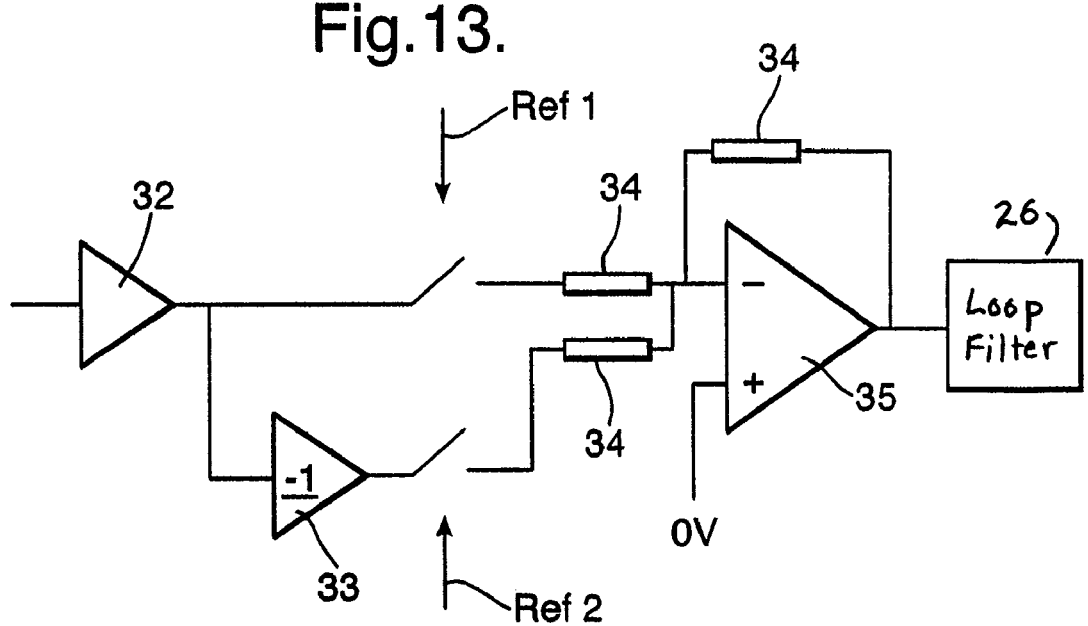
FIG. 13 is a block diagram showing in expanded view the circuit for a demodulator part of the diagram of FIG. 12.
Figure 14:
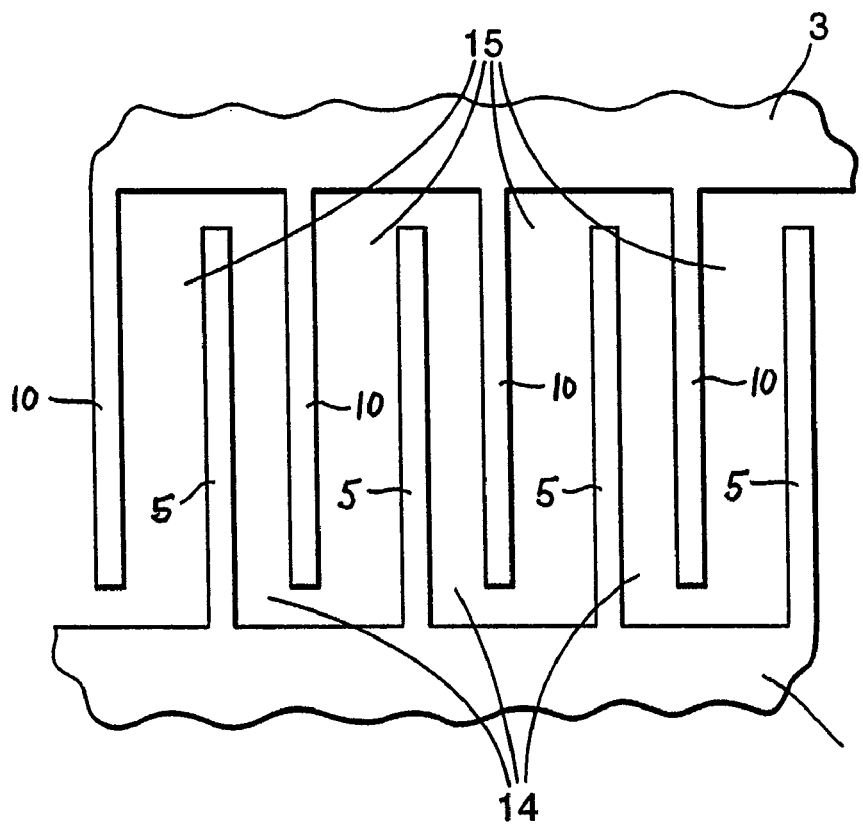
FIG. 14 is a plan view to a larger scale of a detail of the accelerometer of FIG. 3.

A block diagram of the means for providing the first and second drive voltages and for providing pulse width modulation thereto is illustrated in the accompanying FIGS. 12 and 13. The means includes a mark to space generator 22 for receiving a constant fixed reference voltage $V_{ref}$ and for supplying complementary first and second drive voltages $V_1$ and $V_2$ which together do not exceed $V_{ref}$ to the first and third offset arrays 5, 7 of fingers, that is to the upper terminal $T_1$ and to the second and fourth offset arrays of fingers 6 and 8, that is to the base terminal $T_3$. The means includes a pre-amp 23 for receiving an output voltage from the proof mass terminal $T_2$ corresponding to displacement of the proof mass 3. A demodulator 24 is provided for receiving and demodulating an output 25 from the pre-amp 23 together with an integrator/loop filter 26 for receiving, integrating and filtering an output 27 from the demodulator 24 and for in turn feeding a drive signal 28 to the mark to space generator 22. A differential amplifier 29 with low pass filtering 30 is provided for monitoring the first and second drive voltage values $V_1$ and $V_2$ and providing an output at 31.

The demodulator 24 as shown in FIG. 12 includes, for generating References 1 and 2, two monostable circuits as shown in FIG. 13 for limiting the pulse width of the reference signals from the demodulator 24 which in turn limits the output pulse width. A pre-amplifier is provided at 32 and an inverter at 33 with summing resistors at 34. A buffer amplifier is shown at 35.

The voltage reference $V_{ref}$ supplies a highly accurate voltage used for the waveforms that go to the electrode fingers. The detailed value of the voltage will depend on the particular properties of the silicon used and the acceleration range that is to be covered. This voltage defines the scale factor accuracy of the accelerometer and has a square dependence, so an accuracy of better than 100-500 ppm will be required in order to achieve a scale factor accuracy of better than 1000 ppm, or the ability to temperature model to this level of accuracy. A typical voltage of 25 V is required to give the force required to achieve a 50 g dynamic range. An analogue switch switches this voltage between the mark and the space signal to generate the $V_1$ and $V_2$ ($V_2$ being the inverse of $V_1$) signals as shown in FIG. 12.

The signal from the loop filter 26 drives the mark/space ratio generator 22. The filtering includes an integration stage together with filter shaping required to define the bandwidth and accommodate the gain/phase characteristics of the silicon. The output from the silicon goes to the AC pre-amp 23 that then goes to the demodulator 24. This output 25 gives an error signal telling how far away from the null condition the proof mass 3 is. A typical modulation frequency of 100 kHz is used so that at zero g the mark and space times are 5 microseconds each (equal mark/space ratio). Under high g the mark or the space will grow, depending on the sense of the acceleration. The output 28 of the filter 26 is a voltage which defines the mark/space ratio. The filter 26 is adjusted to give the correct bandwidth etc. As part of the filter 26 there will be a short sample and hold, and the voltage from this will then be integrated to provide the voltage that drives the mark/space ratio generator 22.

The range of the mark/space ratio is limited to 5% to 95%. This ensures that there will always be a signal for the control electronics to operate with. At start up therefore the mark/space ratio will always be in the range of 5% to 95%. In order to carry out demodulation the circuit of FIG. 13 is used.

When the proof mass 3 is not on the centre position there is a signal from the silicon at the frequency of the mark/space ratio signal, the sense of which determines whether the proof mass silicon is higher or lower than the centre (null position). This is shown in FIGS. 15 and 16 where two reference signals Ref 1 and Ref 2 are generated from the mark/space drive signals by the use of monostable circuits which are triggered from the rising edge (Ref 1) and the falling edge (Ref 2). These reference signals have a fixed upper voltage (5V to drive logic circuits) and are used to drive the analogue switches, so when the signal is high on Ref 1 or Ref 2 the switch is closed. The monostables are set to give a pulse width corresponding to 5% mark/space ratio. Thus the width of the signal out of the demodulator has always the fixed width regardless of the mark/space ratio (within the limits 5% to 95%). These two signals are then summed together with the summing resistors 34 and then passed to the buffer amplifier 35. The resultant signals as shown in FIGS. 15, 16 show that for a positive offset there is a positive error signal, with a negative output signal for the negative offset of the proof mass 3.

As the mark/space ratio changes, the signals, when integrated, are the same in magnitude so give the same magnitude of error signal to drive the integrator 26 and thus set the mark/space ratio. The integrator 26 acts as a low pass filter, so there is an equivalent DC level that arises from the output signal 28. This ensures that there is a constant open loop gain as a function of mark/space ratio. This is important to ensure that the loop stability conditions are the same for all acceleration inputs. Also the only difference is a timing difference between the output pulse from Ref 1 (triggered by the leading edge) and from Ref 2 (triggered by the falling edge).

As the mark/space ratio is limited to the range 5% to 95% even at start up, there will always be a control signal at start up to drive the servo regardless of the start up mark/space ratio. This will be helpful to ensure that there is a robust start up process, as the control signal is effectively decoupled from the forcing signal. Also during operation the control signal remains effectively the same regardless of the mark/space ratio, giving a more robust operation.

Normally the output of the mark to space ratio generator is from 0V to 5V so an analogue switch (such as a MAXIM part number MAX303) can be switched by this signal to increase the drive voltage to the 25V required for the typical silicon accelerometer to achieve a g range of 50 g.

Thus with the accelerometer of the present invention it is possible to achieve a linear output with applied acceleration which can cover a milli-g range of between plus and minus 50 g with a noise floor of less than 40 micro-g per root Hz depending on the details of the output data rate. The use of the analogue output, using the drive voltages $V_1$ and $V_2$ as the output helps to ensure the overall accuracy of the accelerometer. Use of timing information of the mark/space ratio is prone to error in earlier proposed accelerometers due to variation in rise/fall times for their high voltage drives to the two terminals $T_1$ and $T_3$. The analogue output as used in the accelerometer of the present invention employing the low pass filtered version of the drive voltage, overcomes these problems.

Figure 17:
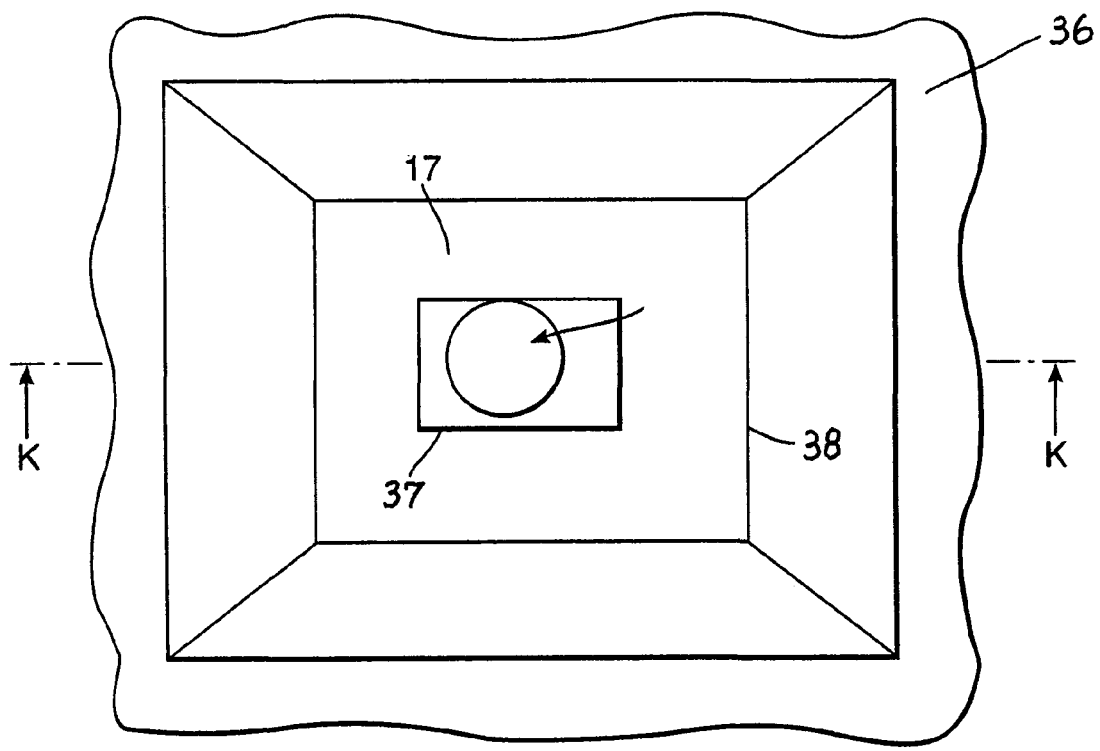
FIG. 17 is a plan view of a detail modification for the accelerometer of FIGS. 3 to 10.
Figure 18:
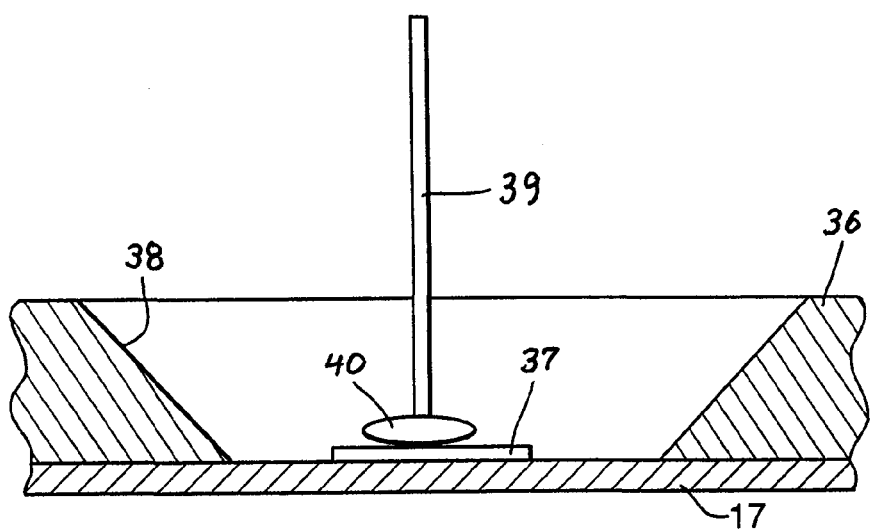
FIG. 18 is a vertical sectional view taken on the line K-K in FIG. 17.

FIGS. 17 and 18 of the accompanying drawings show a detail modification to the accelerometer of the present invention according to FIGS. 3 to 15. As previously pointed out the mounting of a silicon wafer directly onto a glass base 2 has potential disadvantages in that the differential expansion of the two materials implies that the silicon wafer will suffer flexure with temperature which in turn may give rise to accelerometer errors. Other possible disadvantages include ingress of dust, moisture and other gaseous impurities which may impede operation of the fingers 9 and give rise to an uncertain bias and scale factor, stiction and capacitance changes.

Accordingly, in the modification of FIGS. 17 and 18, a plate-like cap 36 is provided made from an electrically non-conductive material such as glass, anodically bonded to the silicon outer support frame 17 to form both a mechanical protection and a hermetic seal. Where the underlying silicon is moveable such as the proof mass 3, mounting legs 4 and fingers 9, the cap may be pre-etched so as to be separate from these items so that they are free to move.

Wire bond pads 37 are provided on the silicon, such as on the outer support frame 17 and are exposed for wires to be attached thereto by apertures 38 there around provided through the cap 36, which apertures allow the cap 36 to maintain the hermetic seal around them. The outer support frame 17 which is anodically bonded to the glass base 2 is also anodically bonded to the cap 36. This allows hermetic sealing of the silicon wafer. Wire bonds 39 are thus attached to the bond pads 37 by intermediate ball bonds 40 conveniently made from gold.

The cap 36 thus balances the stresses that may occur between a silicon/glass structure by providing a glass/silicon/glass structure which will not be subject to bending. By appropriately choosing the anodically bonding temperature it is possible to vary the tension in the silicon wafer if required. As it is known that stress is locked into a structure at the bonding temperature a choice of the temperature and bonding conditions will allow a particular strain to be locked in if required.

The presence of the cap 36, which is a hermetic seal, allows the gaseous medium within the accelerometer to be chosen and set at manufacture independent of any handling after manufacture. Typically atmospheric pressure dry nitrogen may be used to perform the requisite damping. Other gases such as neon may be used which has the benefit of a higher viscosity than nitrogen. This increases the damping that is known to stabilise the closed loop operation of the accelerometer. A higher pressure of gas can slightly increase the viscosity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An accelerometer having
a plate-like base made from an electrically non-conductive material,
an outer substantially planar, ring-like, support frame fixedly bonded to the base,
an inner substantially planar, ring-like, support frame flexibly suspended within the outer frame by mounts connecting the inner frame to the outer frame so that the inner frame is spaced from the base and co-planar with the outer support frame,
a substantially planar plate-like proof mass moveably mounted in the inner support frame which is co-planar therewith,
four or more flexible mounting legs each co-planar with the proof mass and the inner support frame,
with each mounting leg being connected at one end to the proof mass and connected at another end to the inner support frame so that the proof mass is mounted for linear movement in a sensing direction in the plane containing the outer support frame, the inner support frame, the proof mass and the mounting legs, in response to acceleration change applied to the accelerometer,
with the mounting legs extending substantially perpendicularly to the sensing direction,
and with flexible suspension of the inner support frame reducing compressive and/or tensile forces on the mounting legs as a function of temperature on the accelerometer.

2. An accelerometer according to claim 1, wherein the outer support frame is anodically bonded to the base.

3. An accelerometer according to claim 2, wherein the base material is glass.

4. An accelerometer according to claim 3, including a plate-like cap, made from an electrically non-conductive material, anodically bonded to the outer support frame.

5. An accelerometer according to claim 4, wherein the cap material is glass.

6. An accelerometer according to claim 5, including a plurality of interdigitated capacitor fingers fixedly mounted, in a gaseous medium, in the inner support frame for sensing linear movement of, and for providing gaseous medium squeeze damping for, the proof mass in the sensing direction, with the fingers, the proof mass, the mounting legs, the inner support frame and outer support frame being co-planar and formed from a single plate of mono crystalline silicon.

7. An accelerometer according to claim 6, wherein the gaseous medium is air, nitrogen or neon.

8. An accelerometer according to claim 7, wherein the fingers comprise fixed first, second, third and fourth arrays of laterally spaced fingers extending substantially perpendicularly to the sensing direction and away from the inner support frame towards the proof mass, with the first and second arrays being located on one side of the proof mass and with the third and fourth arrays being located on the opposite side of the proof mass, and moveable fifth, sixth, seventh and eighth arrays of laterally spaced finger extending substantially perpendicularly to the sensing direction from and attached to the proof mass towards the inner support frame, with the fifth and sixth arrays being located on said one side of the proof mass and interdigitated respectively with the first and second arrays and with the seventh and eighth arrays being located on said opposite side of the proof mass and interdigitated respectively with the third and fourth arrays, with the interdigitation of the first and fifth arrays and of the third and seventh arrays being at a first offset in one direction in the sensing direction from a median line between adjacent fingers in the first, second, third and fourth arrays, and with the interdigitation of the second and sixth arrays and of the fourth and eighth arrays being at a second offset equal and in the opposite direction to the first offset.

9. An accelerometer according to claim 8, including means for providing a first drive voltage to the first and third arrays of fingers which are offset, and a complementary opposite second drive voltage to the second and fourth arrays of fingers which are offset, such that the interdigitated fingers provide for the proof mass sensing of displacement in response to acceleration applied to the accelerometer, drive and damping of displacement, and means for providing pulse width modulation of the first and second drive voltages with a constant frequency to provide an electrostatic restoring force on the proof mass according to $$F = \frac{CV^2}{2d}$$

where F is the restoring force, C is the capacitance, V is the voltage between the first and second arrays of fingers which are offset, and d is the capacitance gap between the fingers.

10. An accelerometer according to claim 9, wherein the proof mass, the mounting legs, the inner and outer support frames and the interdigitated fingers are formed by dry etching from a plate of silicon which is orientated in the [111] or [100] crystal plane.

11. An accelerometer according to claim 10, wherein the outer support frame has a substantially rectangular ring-like shape surrounding a first inner open area in which is mounted the inner support frame via two mounts spaced apart in the sensing direction and each connecting one side of the outer support frame to one side of the inner support frame.

12. An accelerometer according to claim 11, wherein the inner support frame has a substantially rectangular ring-like shape surrounding a second inner open area in which is located the proof mass which has a substantially rectangular shape, and wherein the mounting legs extend substantially perpendicularly to the sensing direction in spaced array, with at least two legs extending between a first inner wall of the inner support frame defining the second inner open area and a facing first outer wall of the proof mass and with at least two legs extending between an opposing second inner wall of the inner support frame defining the second inner open area and a facing second outer wall of the proof mass.

13. An accelerometer according to claim 12, wherein the mounting legs have high compliance in the sensing direction and low compliance in other directions.

14. An accelerometer according to claim 13, wherein the outer support frame, the first second, third and fourth arrays of fingers are anodically bonded to the base and wherein the mounting legs, the proof mass, the inner support frame and the fifth, sixth, seventh and eighth arrays of fingers are spaced from the base.

15. An accelerometer according to claim 14, including at least four earth screens located with the second inner open area, each being associated with and partially surrounding a respective one of the first, second, third and fourth arrays of fingers, being operable to shield the arrays of fingers from the inner support frame and being electrically insulated from the inner support frame.

16. An accelerometer according to claim 15, wherein the earth screens are fixedly mounted by anodic bonding to the base.

17. An accelerometer according to claim 16, wherein the means for providing the first and second drive voltages and for providing pulse width modulation thereto include a mark to space generator for receiving a constant fixed reference voltage Vref and for supplying complementary first and second drive voltages which together do not exceed Vref to the first and third arrays of fingers which are offset, and to the second and fourth arrays of fingers which are offset, respectively, a pre-amp for receiving an output voltage from the proof mass corresponding to displacement thereof, a demodulator for receiving and demodulating an output from the pre-amp, an integrator/loop filter for receiving, integrating and filtering an output from the demodulator and for in turn feeding a drive signal to the mark to space generator and a differential amplifier with low pass filtering for monitoring the first and second drive voltage values.

18. An accelerometer according to claim 17, wherein the demodulator includes monostable circuits for limiting the pulse width of reference signals from the demodulator.

* * * * *